US007470906B2

(12) United States Patent
Vija

(10) Patent No.: US 7,470,906 B2
(45) Date of Patent: Dec. 30, 2008

(54) ADAPTIVE COLLIMATOR FOR NUCLEAR MEDICINE AND IMAGING

(75) Inventor: A. Hans Vija, Evanston, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 231 days.

(21) Appl. No.: 11/524,801

(22) Filed: Sep. 21, 2006

(65) Prior Publication Data

US 2008/0073599 A1 Mar. 27, 2008

(51) Int. Cl.
*G21K 1/02* (2006.01)
*G01T 1/24* (2006.01)

(52) U.S. Cl. ............................ 250/363.1; 250/363.02; 250/370.08; 250/370.09; 250/370.1; 250/505.1; 378/145; 378/147; 378/148; 378/149; 378/150; 359/641

(58) Field of Classification Search ............. 250/363.1, 250/363.02, 370.08, 370.09, 370.1, 505.1, 250/515.1; 378/19, 37, 90, 145, 147–151, 378/205; 600/407, 436; 359/641, 671
See application file for complete search history.

(56) References Cited

U.S. PATENT DOCUMENTS 4,302,675 A * 11/1981 Wake et al. ............ 250/363.04
4,419,585 A * 12/1983 Strauss et al. ............ 250/505.1
4,465,540 A * 8/1984 Albert ........................ 156/252
4,523,091 A * 6/1985 Persyk ................. 250/214 VT
5,939,724 A * 8/1999 Eisen et al. ............ 250/370.09
7,012,257 B2 * 3/2006 Juni ...................... 250/363.04
2003/0205676 A1 * 11/2003 Nelson et al. .......... 250/370.09
2007/0064876 A1 * 3/2007 Hoffman .................... 378/147
2007/0221853 A1 * 9/2007 Joung .................... 250/363.09
2008/0073540 A1 * 3/2008 Vija ...................... 250/363.05
2008/0073541 A1 * 3/2008 Vija et al. ............. 250/363.05
2008/0073599 A1 * 3/2008 Vija ........................ 250/505.1
2008/0116386 A1 * 5/2008 Wagenaar et al. ...... 250/370.09

* cited by examiner

*Primary Examiner*—Bernard E Souw
(74) *Attorney, Agent, or Firm*—Peter L. Kendall

(57) ABSTRACT

Method and apparatus for varying the hole length of a parallel hole collimator, provides a variably configurable compound collimator for use in nuclear imaging. The collimator has a plurality of substantially parallel oriented collimator cores configured for transition between a contracted configuration and an expanded configuration, wherein a gap space between said collimator cores is greater in the expanded configuration than the contracted configuration. The maximum gap space is designed to prevent photons from one hole in the collimator from reaching the detector proximate an adjacent hole of the collimator.

19 Claims, 3 Drawing Sheets

ADAPTIVE COLLIMATOR FOR NUCLEAR MEDICINE AND IMAGING

FIELD OF THE INVENTION

The present invention generally relates to nuclear medicine, and systems for obtaining nuclear medicine images. In particular, the present invention relates to a method and apparatus for varying the hole length of a parallel hole collimator.

BACKGROUND OF THE INVENTION

Nuclear medicine is a unique medical specialty wherein radiation is used to acquire images which show the function and anatomy of organs, bones or tissues of the body. Radiopharmaceuticals are introduced into the body, either by injection or ingestion, and are attracted to specific organs, bones or tissues of interest. Such radiopharmaceuticals produce gamma photon emissions which emanate from the body. One or more detectors are used to detect the emitted gamma photons, and the information collected from the detectors is processed to calculate the position of origin of the emitted photon from the source (i.e., the body organ or tissue under study). The accumulation of a large number of detected gamma positions allows an image of the organ or tissue under study to be displayed.

In certain nuclear tomographic imaging techniques, such as Single Photon Emission Computed Tomography (SPECT), events are detected by one or more collimated radiation detectors, also referred to as gamma cameras, which are typically rotated about a patient's body in a defined orbital path. The collimators employed with such detectors have apertures running through the body of the collimator to assure that only gamma photons traveling along specific paths aligned with the holes will pass through to the detector. Upon detection of a gamma ray, it is inferred that the gamma ray then came along the same path that the collimator hole is directed.

It should be appreciated that the length, septa thickness, and dimensions of the holes in the collimator affect the resolution and sensitivity of the gamma detector.

In the past, collimator design has been non-adaptive, meaning that the length, septa and dimensions of the collimator holes could not be adjusted. If different resolution and sensitivity is desired, the collimator would have to be replaced with another having different dimensions and characteristics. Such non-adaptive collimators can be illustrated in FIG. 1.

In the non-adaptive collimator displayed in FIG. 1, L is the length of the collimator 1, t is the thickness of the septum, HD is the hole diameter, and R is the distance from the collimator face to the radiation source 2. As illustrated, length L would remain constant and unvarying in conventional collimators. Resolution can be defined as follows:

$$R_c = \frac{HD}{L}(R + L)$$

where HD, L, and R are defined as above and $R_c$ is resolution. The length, hole diameter and distance to the radiation source (in a typical fixed-gantry camera) are not adjustable; therefore the resolution cannot be varied. (It is noted that even the distance R from the face of the collimator to the radiation source were to be varied, the effect on resolution is minimal because of the typical values of R and L involved.)

What is needed is an apparatus or method which enables variation of the collimator characteristics to enable resolution to be adjusted.

SUMMARY OF THE INVENTION

Certain exemplary embodiments of the invention are directed to a variably configurable compound collimator for use in nuclear imaging, said collimator comprising a plurality of substantially parallel oriented collimator cores configured for transition between a contracted configuration and an expanded configuration, wherein a gap space between said collimator cores is greater in the expanded configuration than the contracted configuration;

each of said collimator cores having an aperture extending therethrough and wherein said apertures are mutually aligned thereby forming an elongate passage for gamma photons traveling from a radiation source toward a detector; and said elongate passage having a first length measured along a longitudinal axis thereof in the contracted configuration and a second length measured along the longitudinal axis thereof in the expanded configuration, said second length being greater than said first length and thereby establishing said variably configurable compound collimator.

In further exemplary embodiments the gap space between said collimator cores is continuously variably configurable between said expanded and contracted configurations. In other embodiments, the plurality of collimator cores are arranged in a substantially face-to-face orientation in said contracted configuration with minimal gap space therebetween.

In other embodiments, the gap space is zero or substantially zero when said plurality of collimator cores are arranged in said contracted configuration. In other embodiments, each of said collimator cores has a plurality of apertures extending therethrough, each of said plurality of apertures being aligned with a similarly positioned aperture in an adjacent collimator core.

In further embodiments, each of said collimator cores has a plurality of apertures extending therethrough, each of said plurality of apertures being aligned with similarly positioned apertures in each of the collimator cores constituting said variably configurable compound collimator.

In additional embodiments, the collimator further comprises a plurality of pins extending between each of said collimator cores whereby the collimator cores are held in alignment. The plurality of pins can facilitate the transition between the contracted configuration and the expanded configuration.

In further embodiments, said plurality of collimator cores have a proximal end collimator core which is configured to be closest to a gamma detector when in use, and wherein any gap between said proximal end collimator core and a collimator core immediately subsequent said proximal end collimator is a first gap space, and wherein the first gap space is less than or equal to the maximum gap space between any other of said plurality of collimator cores.

Furthermore, in some embodiments the gap space between each of said plurality of collimator cores may vary. In other embodiments, the gap space between each of said plurality of collimator cores is equal.

Certain additional exemplary embodiments are directed to a method for varying collimator aperture length comprising expanding or contracting a plurality of substantially parallel oriented collimator cores configured for transition between a contracted configuration and an expanded configuration, wherein a gap space between each said collimator core is greater in the expanded configuration than in contracted configuration, each of said collimator cores having an aperture extending therethrough and wherein said apertures are mutually aligned thereby forming an elongate passage for gamma photons traveling from a radiation source toward a detector; and said elongate passage having a first length measured along a longitudinal axis thereof in the contracted configuration and a second length measured along the longitudinal axis thereof in the expanded configuration, said second length being greater than said first length and thereby establishing said variably configurable compound collimator.

DETAILED DESCRIPTION OF THE PREFERRED EMBODIMENTS

The present invention will now be described and disclosed in greater detail. It is to be understood, however, that the disclosed embodiments are merely exemplary of the invention and that the invention may be embodied in various and alternative forms. Therefore, specific structural and functional details disclosed herein are not to be interpreted as limiting the scope of the claims, but are merely provided as an example to teach one having ordinary skill in the art to make and use the invention.

Figure 1:
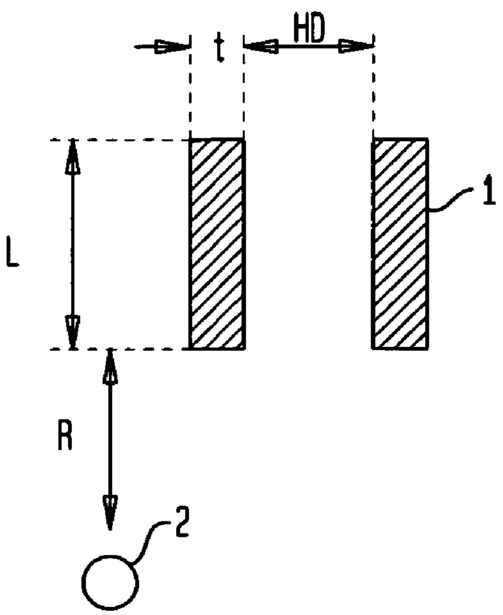
FIG. 1 is a sectional illustrative view of a typical collimator aperture applicable to the present invention.
Figure 2:
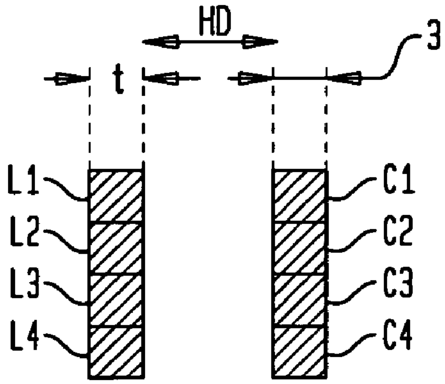
FIG. 2 is a sectional illustrative view of an adaptive parallel hole collimator in a contracted configuration.

An embodiment of an adaptive parallel hole collimator 3 in accordance with one example embodiment of the invention is illustrated in FIG. 2. In some embodiments of the invention, a number of parallel hole collimators are employed having a certain thickness. Multiple collimator cores can be used, and preferably, a plurality of collimator cores are used. Plurality can mean two or more, or at least two parallel hole collimators cores, or can mean 2, 3, 4, 5, 6, or more collimator cores, or a large number of collimator cores. Although multiple collimators, or collimator cores, are used, together they make up one adaptive parallel hole collimator 3. It is preferable that the plurality of collimators cores be placed in a substantially face-to-face orientation.

Each collimator core has a plurality of parallel holes or apertures which extend through the body of the collimator core to allow passage of gamma rays aligned with the apertures. The parallel hole collimator cores can be positioned relative one another such that the parallel holes of each collimator core are mutually aligned with the other. Therefore, with use of a plurality of collimator cores having a plurality of mutually aligned apertures, an elongate passage is thereby formed through the assembly of collimator cores to allow gamma photons from a radiation source to pass therethrough.

Figure 3:
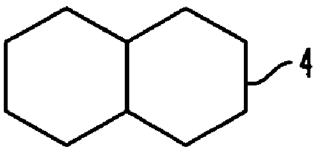
FIG. 3 is an embodiment of a hexagonal packing of a plurality of parallel holes.

The apertures can take the form of any shape including but not limited to circuluar, square, octagonal, and most preferably hexagonal. An embodiment of a hexagonal packing of a plurality of parallel holes 4 of a collimator is illustrated in FIG. 3.

As can be seen in FIG. 2, multiple collimator cores C1-C4 are employed to form a single collimator for a particular imaging application. Each collimator core Cn may have the same septal thickness t, or different thicknesses. The thickness of the collimator core also determines the length L of the collimator core as well as the size of the gap space (if any) between adjacent collimator cores. As shown in FIG. 2, multiple collimator cores, C1, C2, C3, C4, each have a length L1, L2, L3, and L4. Each septum also has a certain thickness t, which can be the same for all collimator cores. HD is the hole diameter and can also be the same between all collimator cores.

As illustrated in FIG. 2, the collimator cores are arranged such that there are two end collimator cores, and when in use one will be closest to the detector and the other end collimator core will be closest to the radiation source. For ease of reference, the end collimator core which is closest to the detector when in use can be known as the proximal end collimator core, and the end collimator core closest to the radiation source when in use, can be known as the distal end collimator. If more than two collimators are employed, then collimators between the end collimators, or middle collimators, will then have another collimator disposed on either face thereof. The collimator cores can be arranged such that the side of each collimator core facing towards the detector when in use can be known as the proximal side, and the side of each collimator facing towards the radiation source when in use can be known as the distal side.

Figure 4:
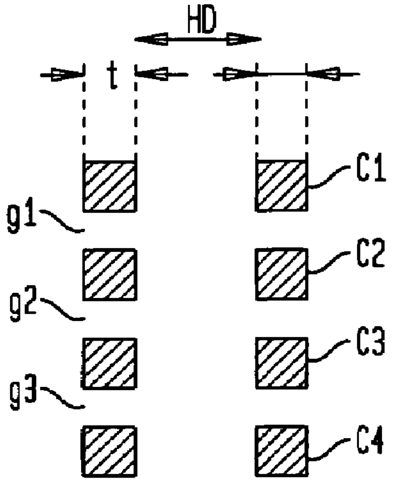
FIG. 4 is a sectional illustrative view of an adaptive parallel hole collimator in an expanded configuration.

Also as illustrated in FIG. 2, all of the collimator cores C1 through C4 are in a contracted configuration. In the FIG. 2 example, the gap space between collimator cores is zero, or substantially zero. However, as illustrated in FIG. 4, collimator cores C1-C4 can be transitioned to an expanded configuration. In this expanded configuration, the gap space g between collimator cores is larger than in the contracted configuration. In some embodiments of the invention, the contracted configuration can have zero gap space or a gap space greater than zero. The expanded configuration can have a gap space between collimator cores that is greater than the gap space in the contracted configuration. In some embodiments the plurality of collimator cores can be transitioned from a contracted configuration to an expanded configuration, or the plurality of collimator cores can be transitioned from an expanded configuration to a contracted configuration. In some embodiments the plurality of collimator cores are continuously variably configurable between the contracted configuration and the expanded configuration. Therefore within some embodiments of the invention, the plurality of collimator cores can be transitioned to achieve any desired gap space. Although the illustrations of FIG. 2 and FIG. 4 employ four collimator cores, the discussion above and below can apply to any number of two or more collimator cores.

By contracting or expanding the collimator cores to various configurations, the length of the apertures extending through the adaptive collimator can be elongated or shortened to variable lengths to achieve desired resolution and sensitivity.

Furthermore, a plurality of pins can be used to align the collimator cores. Pins can extend between and/or connect to the collimator cores to hold the collimator cores in configuration. In some embodiments, the plurality of pins can pass through the collimator cores to assure alignment. Furthermore, the pins can extend through the entire adaptive parallel hole collimator, or, a new set of pins can extend between each collimator core and the collimators cores which may be on either side. The pins facilitate the movement and alignment of the collimator cores as they are moved or adjusted between a contracted configuration and an expanded configuration. In some preferred embodiments, the collimator cores will be thin sheets, and can be used like a stack of cards, and then pulled apart to achieve the desired affect.

Furthermore, in some embodiments, all the collimator cores subsequent to the proximal end collimator core can be moved together in unison during a transition between a contracted configuration and an expanded configuration. However, in other embodiments, collimator cores subsequent to the proximal end collimator core are not moved in unison but can each be moved separately or independently from the other collimator cores.

By moving or adjusting the collimator cores between a contracted configuration and an expanded configuration, the effective hole length L of the adaptive parallel hole collimator can be varied. As illustrated in FIG. 2, each collimator can have a length $L_1$, $L_2$, $L_3$, and $L_4$, which may be the same or may be different from other collimator core lengths. In other embodiments, all the lengths can be different from each other, or a mixture of the same and different lengths. Furthermore, as illustrated in FIG. 4, the gaps between collimators have a certain length, and in FIG. 4, are labeled $g_1$, $g_2$, and $g_3$. Such gaps can all have the same lengths or can vary. The effective adaptive collimator length will be the sum of the gaps g and collimator core lengths L. This can be illustrated by the following equation:

$$\tilde{L} = \sum_{i=1}^{N} L_i + \sum_{i=1}^{N-1} g_i$$

This therefore can be used to determine resolution of the adaptive collimator as follows:

$$R_c = \frac{HD}{\tilde{L}_N}(R + \tilde{L})$$

Also, it should be noted that sensitivity is proportional to the square of the resolution as follows:

$$\epsilon \propto (R_c)^2$$

Therefore, if all the collimator cores are in contracted configuration such that the gap space between all collimators is zero, such that $g_i=0$ for all gaps, then $\tilde{L}=L$, which results in resolution $R_c(g_1)=R_c$. Furthermore, as effective length increases, resolution decreases, and sensitivity decreases as well.

Furthermore, to avoid aliasing, the length of the gap between the proximal end collimator core and the immediate subsequent collimator core must be less than or equal to the maximum gap space $g_{max}$ between any other collimator core pair. This can be illustrated by the following:

$$g_1 \leqq g_{max}$$

where $g_1$ is the gap between the proximal end collimator core and the immediate subsequent collimator core toward the distal end. $g_1$ can be illustrated in FIG. 4 between C1 and C2. Therefore, the gap space between collimator cores should be such that aliasing is avoided.

Figure 5:
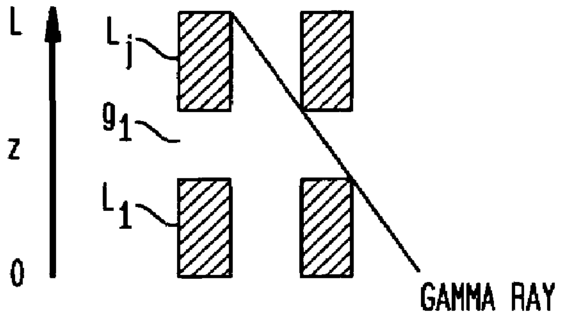
FIG. 5 is a sectional illustrative view of an adaptive parallel hole collimator in an expanded configuration.
Figure 6:
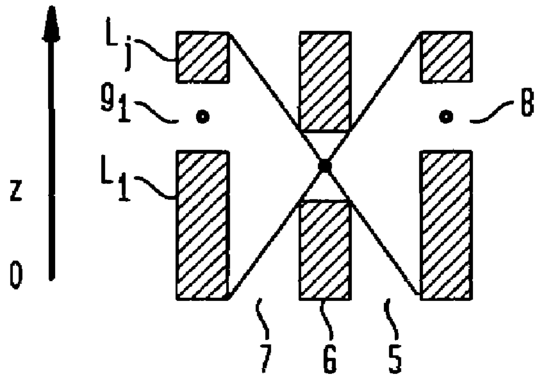
FIG. 6 is a sectional illustrative view of an adaptive parallel hole collimator in an expanded configuration.

As illustrated, in FIG. 5, gamma rays should be prevented from passing through the gap of one septum into another adaptable collimator aperture. Furthermore, as can be seen in FIG. 6, a gamma ray from a radiation source should not be able to pass through adaptive collimator aperture 5, through a gap in septum 6, to reach the detector in adaptive collimator hole 7.

As indicated in FIG. 5, $L_1$ is the length of a first collimator core, and $L_i$ is the length of subsequent collimator cores, where i can be from 2 to N. Furthermore, $g_i$ is the gap between collimators where i is the number of gaps from 1 . . . 1−N. z is any particular length from 0 to L, where L is the total effective length of the collimator. With reference to FIGS. 5 and 6, $g_{max}$ can be calculated by use of the following equations:

For adaptive collimator hole 7:

$$\frac{HD}{L_1 + L_2 + g_1}$$

For adaptive collimator hole 8:

$$\frac{2HD + t}{L_1 + L_2 + g_1}$$

Thus, $g_{max}$ can be determined in a similar manner with reference to further adaptive collimator holes taking into account hole diameter and thickness of relevant collimator apertures.

Furthermore, gap geometry can be determined as illustrated in FIG. 6. In FIG. 6, i is the number of gaps, 1 . . . N, from the proximal side to the distal side of the collimator. Furthermore, j is the number of holes, 1 . . . M, across the face of the collimator. The center of the gap 8 can be determined wherein $g_{ij}(z)$=center of gap, where z is the position of the gap along the length of a septum of the adaptive collimator.

Figure 7:
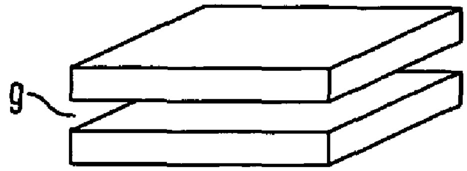
FIG. 7 is a perspective view of an adaptive parallel hole collimator wherein the gaps between collimators are all in the same plane.
Figure 8:
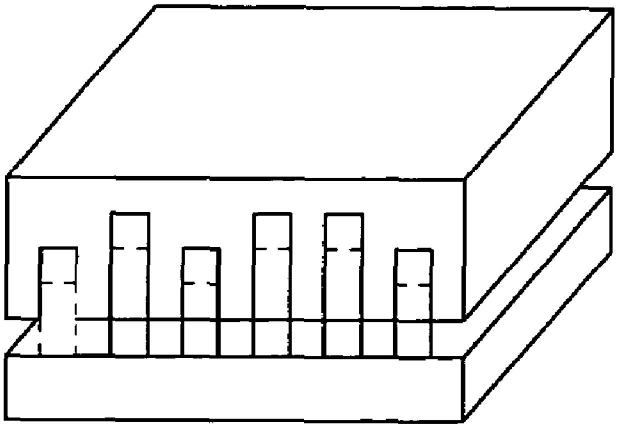
FIG. 8 is a perspective view of an adaptive parallel hole collimator wherein the grooves are longer than the septa.

Furthermore, the gaps between collimator cores can be all in the same plane as displayed in FIG. 7, or can vary as well as shown in FIG. 8. Moreover, as shown in FIG. 8, the holes can be longer than the septa.

Figure 9:
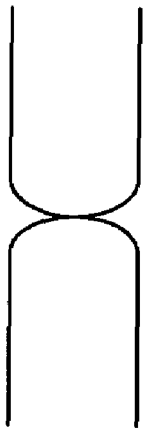
FIG. 9 is a sectional illustrative view wherein the septum is rounded.

Additionally, according to some embodiments of the invention, the shape of the gap can vary, wherein the septum can be square as in FIG. 6, or the septum can be rounded as in FIG. 9.

By varying the effective hole length of the adaptive parallel hole collimator, one can affect the sensitivity and resolution of the detector with the adaptive collimator. Thus, one can take measurements of the radiation source with the collimator cores in one configuration, then adjust to another configuration and take a reading at a different resolution and sensitivity setting. The variable collimator can be easily adjusted to many different configurations to affect aperture hole length extending through the variable collimator and obtain readings at different desired settings. Furthermore, a computer can be employed to automatically change the collimator assembly between expanded and contracted configurations to achieve desired resolution and sensitivity.

There are a variety of ways for preparation of the adaptable collimator, however such preparation methods should be directed to assuring alignment of the collimator cores so that image quality (e.g. sensitivity) is not lost due to misalignment.

In one embodiment is to use the current production method for foil collimators, but with less thick strips of lead. As indicated above, pins or a pin mask can be used to align the collimator cores. Furthermore, software can be used to find the optimal relative position of the N parallel hole collimators to achieve optimal image quality.

To ensure quality control, one embodiment comprises placing all collimator cores on individual trays which can move in x, y, z direction, as well as rotate about an axis very accurately and with precision. A point far from the detector can then emit radiation or shine on the collimator assembly. A computer with appropriate software which iteratively aligns the collimator orientation and calculates values allowing for the mechanical alignment of the collimators in the final assembly.

Other methods for preparation of the assembly forming the adaptive parallel hole collimator can involve freeze cutting, laser cutting and/or filling the hole or holes with a stabilize foam, which would be chemically removed after the cutting procedure.

Collimator cores can be made by high Z materials known in the art, but most preferably Au or W.

It should be appreciated by those having ordinary skill in the art that while the present invention has been illustrated and described in what is deemed to be the preferred embodiments, various changes and modifications may be made to the invention without departing from the spirit and scope of the invention. Therefore, it should be understood that the present invention is not limited to the particular embodiments disclosed herein.

The invention claimed is:

1. A variably configurable compound collimator for use in nuclear imaging, said collimator comprising:

a plurality of substantially parallel oriented collimator cores configured for transition between a contracted configuration and an expanded configuration, wherein a gap space between said collimator cores is greater in the expanded configuration than the contracted configuration;

each of said collimator cores having an aperture extending therethrough and wherein said apertures are mutually aligned thereby forming an elongate passage for gamma photons traveling from a radiation source at one end of said compound collimator toward a detector at the other end of said compound collimator; wherein said elongate passage has a first length measured along a longitudinal axis thereof in the contracted configuration and a second length measured along the longitudinal axis thereof in the expanded configuration, said second length being greater than said first length and thereby establishing said variably configurable compound collimator.

2. The collimator as recited in claim 1, wherein the gap space between said collimator cores is continuously variably configurable between said expanded and contracted configurations.

3. The collimator as recited in claim 1, wherein said plurality of collimator cores are arranged in a substantially face-to-face orientation in said contracted configuration with minimal gap space therebetween.

4. The collimator as recited in claim 3, wherein said gap space is zero or substantially zero when said plurality of collimator cores are arranged in said contracted configuration.

5. The collimator as recited in claim 1, wherein each of said collimator cores has a plurality of apertures extending therethrough, each of said plurality of apertures being aligned with a similarly positioned aperture in an adjacent collimator core.

6. The collimator as recited in claim 1, wherein each of said collimator cores has a plurality of apertures extending therethrough, each of said plurality of apertures being aligned with similarly positioned apertures in each of the collimator cores constituting said variably configurable compound collimator.

7. The collimator as recited in claim 1, further comprising plurality of pins extending between each of said collimator cores whereby the collimator cores are held in alignment.

8. The collimator as recited in claim 7, wherein the plurality of pins facilitate the transition between the contracted configuration and the expanded configuration.

9. The collimator as recited in claim 1, wherein said plurality of collimator cores have a proximal end collimator core which is configured to be closest to a gamma detector when in use, and wherein any gap between said proximal end collimator core and a collimator core immediately subsequent said proximal end collimator is a first gap space, and wherein the first gap space is less than or equal to the maximum gap space between any other of said plurality of collimator cores.

10. The collimator as recited in claim 9, wherein the gap space between each of said plurality of collimator cores may vary.

11. The collimator as recited in claim 1, wherein the gap space between each of said plurality of collimator cores is equal.

12. The collimator as recited in claim 1, wherein the septum between each said collimator cores is rounded.

13. The collimator as recited in claim 1, wherein the first length and second length include a thickness of each collimator core and the gap space between each collimator core.

14. The collimator as recited in claim 1, wherein the plurality of collimators are further configured to transition from an expanded configuration and a contracted configuration.

15. A method for varying collimator aperture length of a collimator used in nuclear radiation detection, comprising the steps of:

expanding or contracting a plurality of substantially parallel oriented collimator cores configured for transition between a contracted configuration and an expanded configuration, wherein a gap space between each said collimator core is greater in the expanded configuration than in contracted configuration, each of said collimator cores having an aperture extending therethrough and wherein said apertures are mutually aligned thereby forming an elongate passage for gamma photons traveling from a radiation source toward a detector; and said elongate passage having a first length measured along a longitudinal axis thereof in the contracted configuration and a second length measured along the longitudinal axis thereof in the expanded configuration, said second length being greater than said first length and thereby establishing said variably configurable compound collimator.

16. The method of claim 15, wherein said gap space is zero or substantially zero when said plurality of collimator cores are arranged in said contracted configuration.

17. The method of claim 15, wherein the gap space between said collimator cores is continuously variably configurable between said expanded and contracted configurations.

18. The method of claim 15, further comprising plurality of pins extending between each of said collimator cores whereby the collimator cores are held in alignment.

19. The method of claim 18, wherein the plurality of pins facilitate the transition between the contracted configuration and the expanded configuration.

* * * * *